(12) United States Patent
Gallet

(10) Patent No.: US 8,932,018 B2
(45) Date of Patent: Jan. 13, 2015

(54) COUNTERWEIGHT-BASED DEVICE FOR CONTROLLING THE ORIENTATION OF FAN BLADES OF A TURBOPROP ENGINE

(75) Inventor: Francois Gallet, Paris (FR)

(73) Assignee: SNECMA, Paris (FR)

( * ) Notice: Subject to any disclaimer, the term of this patent is extended or adjusted under 35 U.S.C. 154(b) by 332 days.

(21) Appl. No.: 13/582,254

(22) PCT Filed: Feb. 18, 2011

(86) PCT No.: PCT/FR2011/050348
§ 371 (c)(1),
(2), (4) Date: Nov. 6, 2012

(87) PCT Pub. No.: WO2011/107691
PCT Pub. Date: Sep. 9, 2011

(65) Prior Publication Data
US 2013/0047756 A1    Feb. 28, 2013

(30) Foreign Application Priority Data
Mar. 1, 2010   (FR) ..................... 10 51458

(51) Int. Cl.
   B64C 11/06   (2006.01)
   F04D 29/32   (2006.01)
   B64C 11/32   (2006.01)
   (Continued)

(52) U.S. Cl.
   CPC ............ F04D 29/323 (2013.01); B64C 11/325 (2013.01); B64C 11/48 (2013.01); F01D 7/00 (2013.01); F02C 6/206 (2013.01);
   (Continued)

(58) Field of Classification Search
   CPC .......... F01D 7/00; F01D 25/16; F01D 25/183; F02C 7/06; F02K 3/072; F16J 15/52; F16J 3/047
   USPC ........................................ 416/151, 153, 160
   See application file for complete search history.

(56) References Cited

U.S. PATENT DOCUMENTS

| 2,844,303 A | 7/1958 | Kristiansen et al. |
| 3,549,272 A | 12/1970 | Badger et al. |

(Continued)

FOREIGN PATENT DOCUMENTS

GB   2 218 747   11/1989

OTHER PUBLICATIONS

International Search Report Issued Aug. 25, 2011 in PCT/FR11/050348 Filed Feb. 18, 2011.

*Primary Examiner* — Nathaniel Wiehe
*Assistant Examiner* — Jeffrey A Brownson
(74) *Attorney, Agent, or Firm* — Oblon, Spivak, McClelland, Maier & Neustadt, L.L.P.

(57) ABSTRACT

A device for controlling orientation of fan blades of a turboprop including at least one set of fan blades having adjustable orientation attached in rotation to a rotating ring mechanically connected to a turbine rotor. Each blade of the set is coupled to a blade root support pivotably mounted on the rotating ring by a conical gear train including a first gear wheel attached to the blade root support and a second gear wheel attached to the rotating ring and bearing a counterweight that is eccentric with respect to its axis of rotation. A cylinder attached in rotation to the turbine rotor and a rod of which is connected to each counterweight through a connecting arm makes it possible to impart synchronous angular displacement to all the counterweights about the axis of rotation of their respective gear wheel.

8 Claims, 4 Drawing Sheets

(51) Int. Cl.
*B64C 11/48* (2006.01)
*F01D 7/00* (2006.01)
*F02C 6/20* (2006.01)
*B64D 27/02* (2006.01)

(52) U.S. Cl.
CPC .......... *B64D2027/026* (2013.01); *Y02T 50/671* (2013.01); *F05D 2220/325* (2013.01)
USPC .......................................... 416/153

(56) References Cited

U.S. PATENT DOCUMENTS

| | | | | |
|---|---|---|---|---|
| 4,913,623 | A | * | 4/1990 | Schilling et al. ................. 416/51 |
| 5,174,716 | A | * | 12/1992 | Hora et al. ....................... 416/26 |
| 5,595,474 | A | * | 1/1997 | Girard ............................... 416/1 |
| 2012/0070289 | A1 | | 3/2012 | Charier et al. |

* cited by examiner

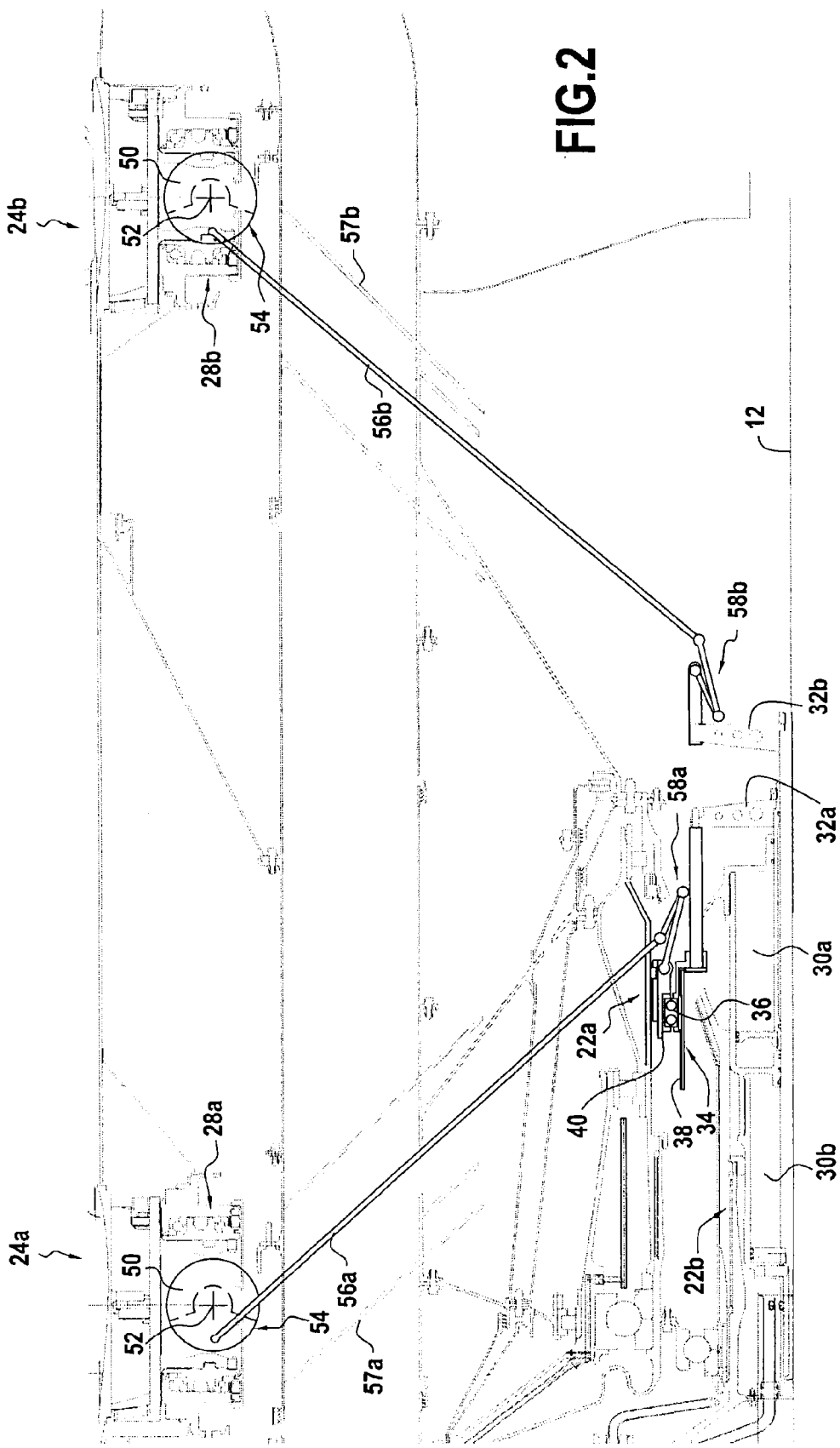

COUNTERWEIGHT-BASED DEVICE FOR CONTROLLING THE ORIENTATION OF FAN BLADES OF A TURBOPROP ENGINE

BACKGROUND OF THE INVENTION

The present invention relates to the general field of turboprops comprising at least one set of variable orientation fan blades. It relates more particularly to orientation control of the fan blades of a dual propeller aircraft turboprop.

In known fashion, a dual propeller aircraft turboprop includes a turbine with two counter-rotating rotors each driving one set of unducted fan blades. Reference can be made for example to document GB 2,129,502 which describes different embodiments of such a turboprop.

In this kind of turboprop, the orientation of the fan blades of each set (the term pitch control is also used) constitutes one of the parameters making it possible to control the thrust of the turboprop.

Different solutions have been proposed for controlling the fan blades of a given set. Reference can be made for example to French patent applications No. 09 53589 and 09 53591 filed by the Applicant on 29 May 2009. In these applications, provision is made for coupling the blades, for the purpose of adjusting their orientation, to a synchronization ring moved in rotation by means of a central cylinder and connecting arms.

OBJECT AND SUMMARY OF THE INVENTION

The present invention has as its principal object to propose a solution for control of the orientation of the fan blades of a turboprop which is simple to implement while still being reliable and having low mass.

This goal is attained thanks to a turboprop fan blade orientation control device including at least one set of fan blades with adjustable orientation, the set being attached in rotation to a rotating ring mechanically connected to a turbine rotor, characterized in that each blade of the set is coupled, for control of its orientation, to a blade root support pivotably mounted on the rotating ring by means of a conical gear train consisting of a first gear wheel attached to the blade root support and centered on a axis radial to the rotating ring and of a second gear wheel attached to the rotating ring, centered on an axis tangential to said rotating ring, and bearing a counterweight that is eccentric with respect to its axis of rotation, the device also including a cylinder centered on the axis of rotation of the rotating ring, attached in rotation to the turbine rotor and the rod whereof is connected to each counterweight through connecting arms so as to angularly displace all the counterweights in a synchronized fashion about the axis of rotation of their respective gear wheel.

Such a control device exhibits numerous advantages. In particular, it is reliable and lightweight because it has relatively few parts, with simple mechanical connections. In particular, there are no intermediate parts for guiding in rotation or in translation which would have been difficult to adjust and subject to wear effects. Further, the maintenance of such a device is particularly easy because the counterweights that are accommodated on the outside of the rotating ring are easily accessible.

Each connecting arm can include a radial link having one end connected to the corresponding counterweight and the other end connected to one arm of a bellcrank, the other arm whereof is connected to the rod of the cylinder.

Advantageously, the radial link of each connecting arm runs radially through an arm of the turboprop housing.

Also advantageously, for each blade root support, the number of teeth of the first gear wheel of the conical gear train is substantially twice the number of teeth of the second gear wheel.

The feathered position of the blades can correspond to an angular position of the counterweights pointing radially outward from the rotating ring. Likewise, the 0° position of the blades corresponds to an unstable angular position of the counterweights pointing radially inward from the rotating ring.

The connecting arms can be evenly distributed about the axis of rotation of the rotating ring. Finally, the set can include ten fan blades.

The invention also relates to a dual propeller turboprop comprising a turbine having two counter-rotating rotors and two sets of controllable orientation fan blades linked to two rotating rings respectively connected to the rotors, control of the orientation of the fan blades of at least one of the sets being carried out by a control device such as that defined previously.

BRIEF DESCRIPTION OF THE DRAWINGS

Other features and advantages of the present invention will appear from the description given below, with reference to the appended drawings which illustrate one embodiment of it without any limitation. In the figures:

FIG. 2 is a magnified view of FIG. 1 showing the propeller orientation control of the upstream and downstream sets;

DETAILED DESCRIPTION OF AN EMBODIMENT

Figure 1:
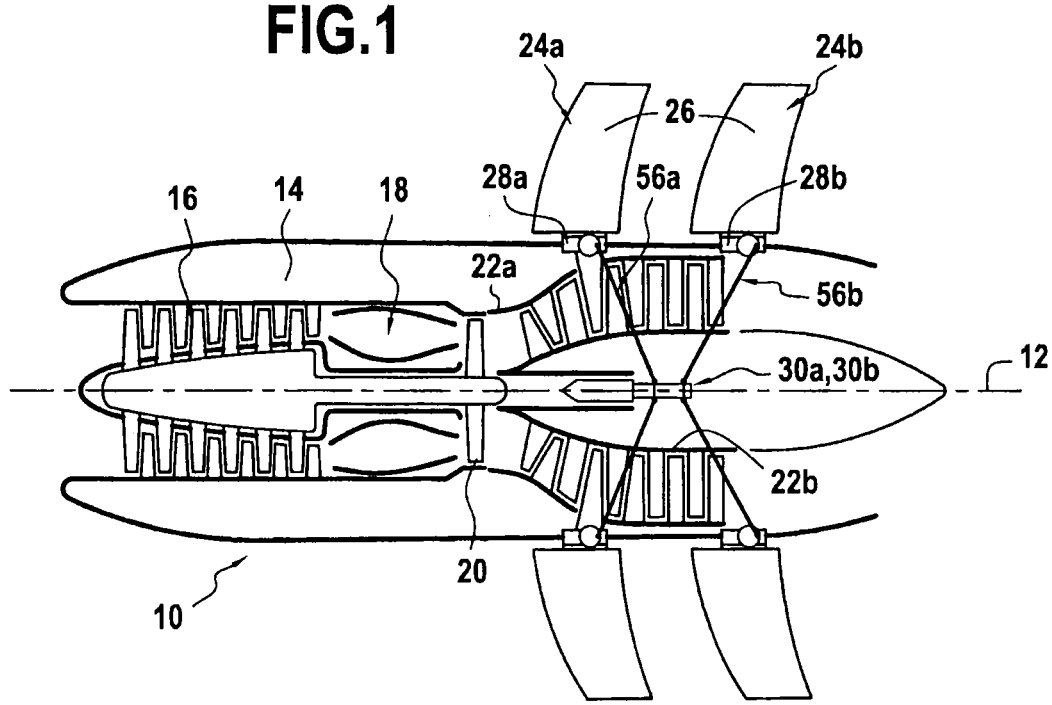
FIG. 1 is a schematic longitudinal section view of a dual-propeller turboprop equipped with a propeller orientation control device according to the invention.

FIG. 1 shows very schematically an example of implementation of a dual propeller type aircraft turboprop.

Such a turboprop is known and will therefore not be described in detail. The turboprop 10 includes in particular a longitudinal axis 12 and an annular nacelle 14 arranged coaxially about the longitudinal axis. The turboprop 10 also includes, from upstream to downstream, a compressor 16, a combustion chamber 18 and a turbine 20 having two counter-rotating rotors 22a, 22b, these different elements also being arranged coaxially about the longitudinal axis 12 of the turboprop.

The turboprop 10 also includes an upstream (or front) set 24a and a downstream (or rear) set 24b of fan blades 26 having adjustable orientation. More precisely, the fan blades 26 of each set 24a, 24b mounted on a rotating ring 28a, 28b in the form of an annular platform centered on the longitudinal axis 12 of the turboprop.

Further, the fan blades 26 of each set are evenly spaced circumferentially and extend radially from the surface of the respective rotating ring 28a, 28b (they are not ducted). Each rotor 22a, 22b of the turbine 20 carries and drives in rotation one of the rotating rings 28a, 28b whereon is mounted one of the fan blade sets 24a, 24b having adjustable orientation.

The turboprop also includes a device for controlling the orientation of the fan blades of each set 24a, 24b. The control device according to the invention allows control of the orientation of the fan blades of both the upstream set 24a and the downstream set 24b. It could however be used for control of the orientation of the blades of only one of said sets.

As shown more precisely in FIG. 2, the control device according to the invention includes two cylinders 30a, 30b driving mechanisms for changing the orientation of the fan blades of the upstream and downstream sets, said mechanisms based particularly on links having been described previously.

The cylinders 30a, 30b (hydraulic, pneumatic or electrical) of the control device are coaxial, centered on the longitudinal axis 12 and attached in rotation to a shaft of one of the rotors 22a, 22b of the turbine 20 (in the example described here, the cylinders are linked in rotation to a shaft of the rotor 22b driving the downstream set 24b in rotation).

The respective rods 32a, 32b of these two cylinders translate axially along the longitudinal axis 12, the rod 32a of the outer cylinder 30a setting the orientation of the fan blades of the upstream set 24a and the rod 32b of the inner cylinder 30b setting the orientation of the fan blades of the downstream set 24b.

It should be noted that as the two cylinders 30a, 30b are attached to the rotor 22b, they therefore rotate about the longitudinal axis 12 in the direction of rotation of the fan blades of the downstream set 24b. Now, however, the orientation change mechanism of the fan blades of the upstream set 24a to which the cylinder 32a is linked is driven in rotation in the opposite direction. Therefore a rolling-contact (ball or tapered-roller) bearing 34 is mounted between the rod 32a of the inner cylinder and the orientation change mechanism of the fan blades of said upstream set in order to transmit the axial thrust of the inner cylinder while still leaving the two entities free to rotate in opposite directions.

More precisely, the inner race 36 of the rolling-contact bearing 34 is mounted on a shaft of the rotor 22b driving in rotation the downstream set 24b through splines 38 and is linked to the rod 32a of the inner cylinder. As for the outer race 40 of the bearing 34, it is connected to the orientation change mechanism of the fan blades of the upstream set. Thus the rolling-contact bearing 34 follows the rotation of the shaft of the rotor 22b relative to a shaft of the rotor 22a driving in rotation the upstream set 24a.

In connection with FIGS. 3A, 3B, 4A and 4B, the orientation change mechanisms of the fan blades of the upstream and downstream sets will now be described. These mechanisms are identical for the upstream set and the downstream set.

Figure 3A:
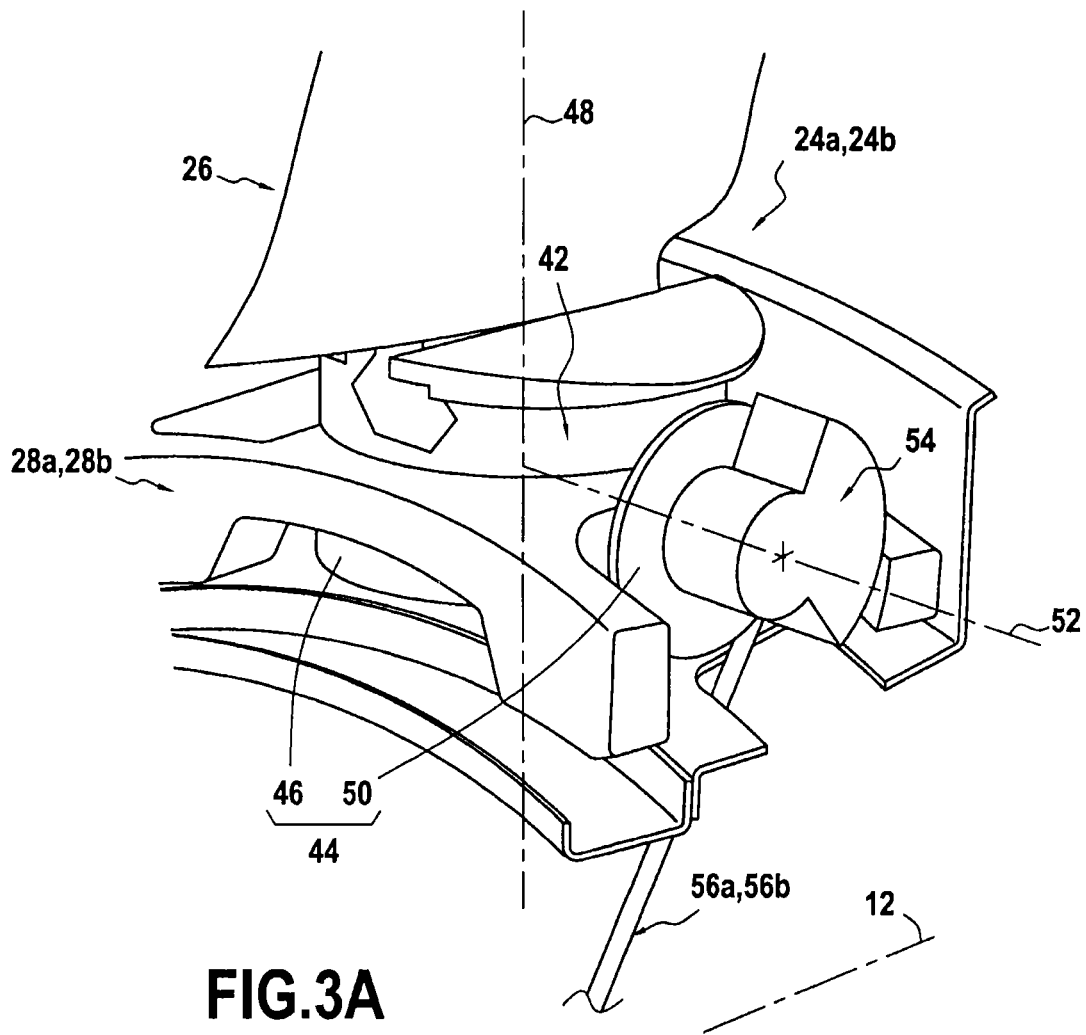
FIGS. 3A and 3B are respectively perspective and radial section views showing the orientation control of one fan blade of the turboprop of FIG. 1 using the device according to the invention.
Figure 3B:
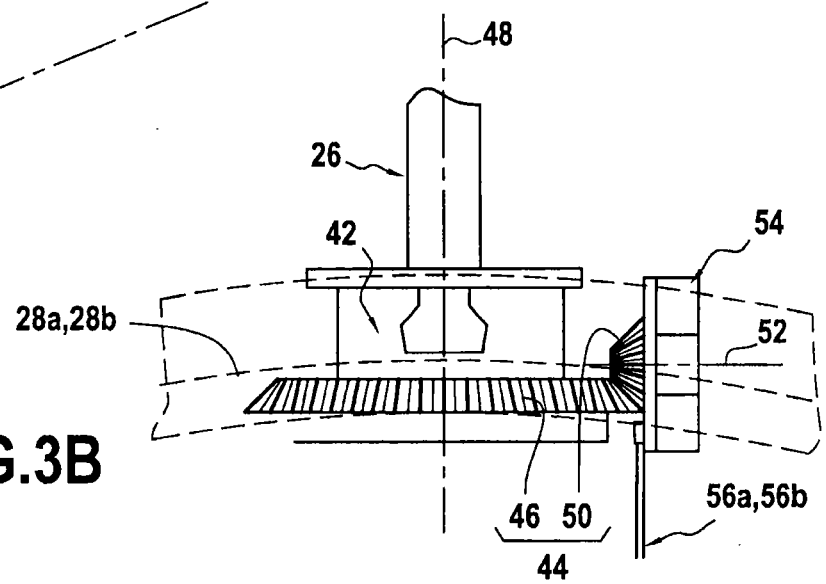

Each blade 26 of the sets 24a, 24b is coupled to a blade root support 42 pivotably mounted on the rotating ring 28a, 28b by means of a conical gear train 44. As shown in FIGS. 3A and 3B, this conical gear train consists of a first gear wheel 46, attached to the blade root support 42 and centered on an axis 48 radial to the rotating ring, and of a second gear wheel 50 attached to the rotating ring and centered on an axis 52 tangential to the rotating ring.

The number of teeth of the first gear wheel 46 of such a conical gear train 44 is selected so as to be substantially two times the number of teeth of the second gear wheel 50. Thus, a 90° rotation of the second gear wheel will bring about roughly a 45° rotation of the first gear wheel.

Furthermore, the second gear wheel 50 of each conical gear train carries a weight acting as a counterweight 54, said counterweight being eccentric relative to the axis of rotation 52 of the wheel. The mass of this counterweight is predefined particularly according to the characteristics of the fan blades.

Each fan blade orientation change mechanism also has a plurality of connecting arms which connect the rod 32a, 32b of the cylinder 30a, 30b corresponding to the counterweight 54 of the corresponding set of fan blades.

These connecting arms have the function of converting the axial motion of the cylinder rod into a synchronized rotation of the counterweights of the corresponding fan blade set about their respective axis of rotation 52.

To this end, each connecting arm includes a radial link 56a, 56b running through a housing arm 57a, 57b of the turboprop and having one end connected to the corresponding counterweight and the other end connected to one arm of a bellcrank 58a, 58b the other arm whereof is connected to the rod 32a, 32b of the corresponding cylinder. Each connecting arm also has a guide link 60a, 60b one end whereof is connected to the link between the two arms of the bellcrank and the other end whereof acts as a guiding support for the radial link 56a, 56b.

Figure 4A:
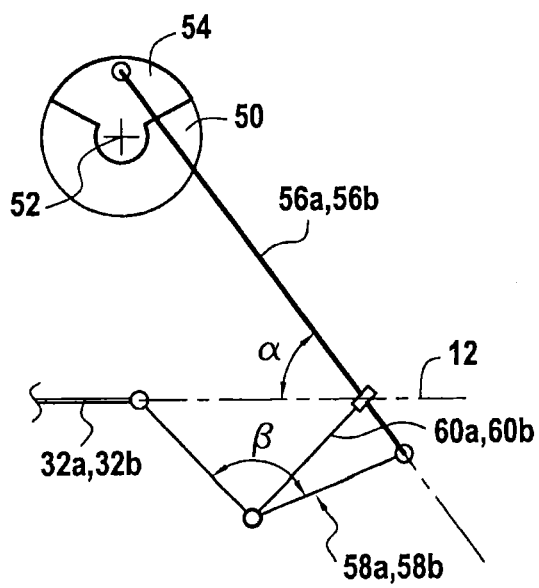
FIGS. 4A and 4B show schematically the kinematics of the control device according to the invention.
Figure 4B:
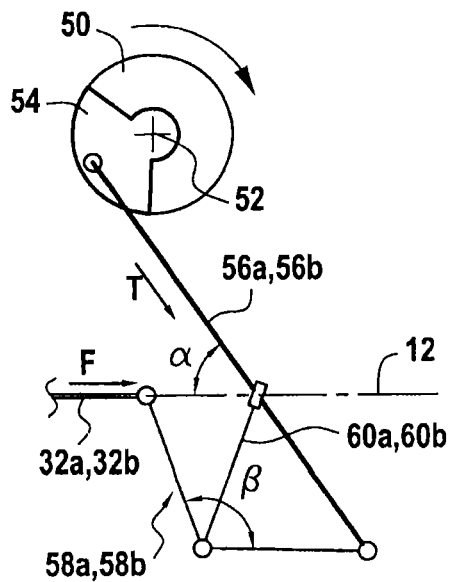

The kinematics of motion of the connecting arms is illustrated in FIGS. 4A and 4B.

In FIG. 4A, the counterweight 54 of the second gear wheel 50 is pivoted upward (that is toward the outside of the rotating ring whereon is mounted the corresponding blade root support). As described in detail later, this position of the counterweight corresponds for example to feathering of the associated blade.

In FIG. 4B, the counterweight has pivoted angularly through approximately ¾ of a turn clockwise relative to the position of FIG. 4A (to put the associated blade into thrust reversal position). This rotation is obtained by operating the cylinder which drives an axial displacement of the rod 32a, 32b of the cylinder in the direction of the arrow F, said displacement causing a pulling motion T on the radial link 56a, 56b of the connecting arm.

Of course, other angular positions of the counterweights (and therefore other intermediate settings of the blade) can be obtained by suitably displacing the rod 32a, 32b of the corresponding cylinder.

For such kinematics to operate correctly, it is necessary that the following geometric conditions be satisfied:

X=Y=Z (X and Y being the lengths of the arms of the bellcrank 58a, 58b and Z the length of the guide link 60a, 60b); and β=2×α (β being the angle formed between the arms of the bellcrank and α the angle formed between the radial link 56a, 56b and the longitudinal axis 12 whereon is centered the corresponding rod 32a, 32b of the cylinder).

In connection with FIGS. 5A through 5D, the different possible fan blade setting configurations will now be described that are obtainable by the control device according to the invention.

Figure 5A:
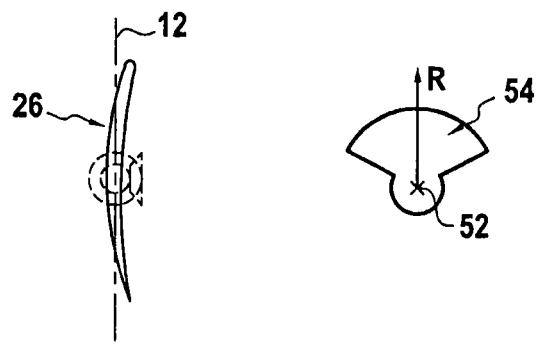
FIGS. 5A through 5D illustrate different settings of a blade as a function of the angular position of the counterweight associated with it.

FIG. 5A shows feathering of the blade 26 (also called minimum-incidence setting), that is to say a position wherein the blade is positioned (along the longitudinal axis 12) in the direction of travel of the airplane to minimize drag. This position is a safety position.

The feathering position of the blade 26 is preferably associated with an upward-turned angular position of the corresponding counterweight 54, that is directed radially outward from the rotating ring whereon is mounted the blade root support (the radially outward direction is given schematically by the arrow R in the figures). Such a configuration thus exhibits several advantages. In particular, in the event of breakage of a radial link 56a, 56b, the counterweight 54 will position itself upward (FIG. 5A) under the influence of the centrifugal force due to the rotation of the rotating ring, resulting in feathering of the corresponding blade. The safety of the control device according to the invention is thus assured in the event of failure. Further, as the counterweights will tend, in operation, to position themselves upward, the radial links are sized to work in tension, and not in compression or in torsion, so they can have a smaller diameter.

Figure 5B:
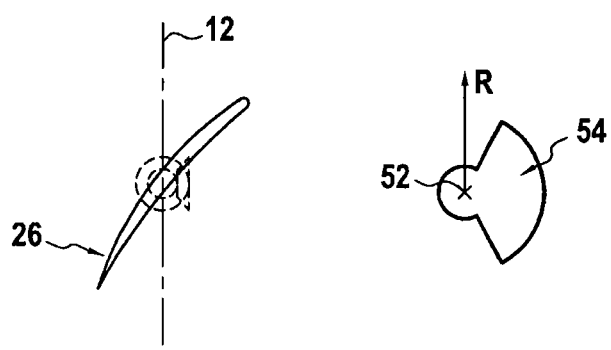

In FIG. 5B, the counterweight 54 is pivoted one quarter turn clockwise about its axis of rotation 52 relative to FIG. 5A, which corresponds, considering the gear ratio between the gear wheels of the conical gear train, to a 45° pivot of the blade 26 with respect to its feathered position. This pivoting of the counterweight is obtained as described previously in connection with FIGS. 4A and 4B. Such a setting of the blade 26 corresponds to a flight position wherein the blade is extended to create thrust.

Figure 5C:
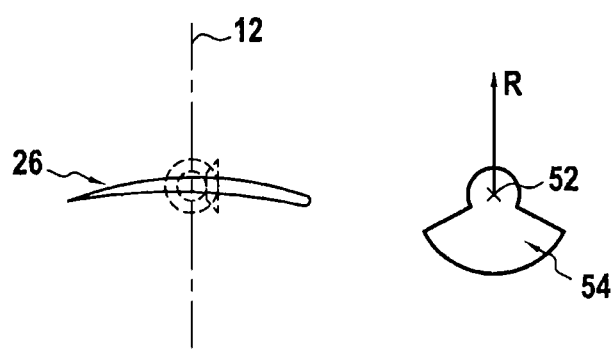

In FIG. 5C, the counterweight 54 is once again pivoted clockwise one quarter turn relative to FIG. 5B, which corresponds to a pivot of 90° of the blade 26 compared to its feathered position (corresponding therefore to an angular position of the counterweight directed radially inward from the rotating ring). This setting, called the "0° position" of the blade 26 must however be transitory during movement to a position of thrust reversal (the case of FIG. 5D) because there is a risk of overspeed if this setting is maintained for an extended period. The counterweight being aligned with the radial direction R, it is not subjected to a torque and is therefore in equilibrium. However, this equilibrium is unstable because the counterweight seeks, under the influence of centrifugal force, to turn upward, from one side or the other. The blade 26 therefore has a tendency to move away from the 0° position, which is a guarantor of safety. Thus, this 0° position can only be transient during movement toward a thrust reversal position.

Figure 5D:
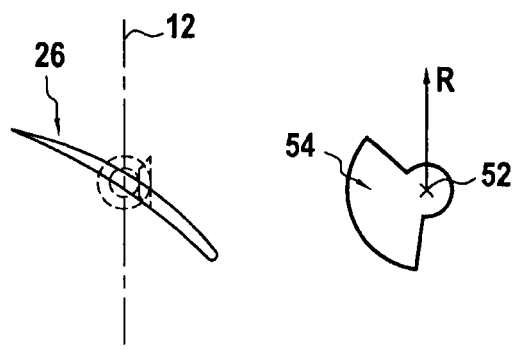

FIG. 5D therefore illustrates the blade 26 in thrust reversal position (also called the "reverse" position). With such a setting, the blade is oriented rearward to create an opposing thrust to help with braking of the airplane. To reach such a setting starting from a flight position of the blade, all that is needed is that the radial link pull sufficiently on the counterweight 54 to return the blade toward the 0° position of FIG. 5C: by inertia, the counterweight will continue its motion to move to the other side and thus bring the blade into reverse position thanks to the effect of the centrifugal force of rotation of the rotating ring.

As a supplement, adding an electric actuator (rotary motor or some other type) could be considered, which would help the counterweight to move to the other side in the event that the inertia of the mechanism would not be sufficient, the electric actuator then possibly being supplied with power by the propeller deicing circuit.

It should be noted that the figure show a turboprop configuration example wherein the set of blades wherein the control device according to the invention is located comprises ten fan blades 26 controlled by an equal number of connecting arms evenly spaced about the longitudinal axis 12 of the turboprop.

Moreover, the invention was described above in connection with a turboprop having a counter-rotating turbine directly connected with the propellers. Of course, the invention also applies to dual propeller turboprops the propellers whereof are driven by a planetary gear reduction unit.

The invention claimed is:

1. A control device for orientation of fan blades of a turboprop, comprising:
   at least one set of fan blades having adjustable orientation, the set being attached in rotation to a rotating ring mechanically linked to a rotor of a turbine, each blade of the set being coupled, for control of its orientation, to a blade root support mounted pivotably on the rotating ring by a conical gear train including a first gear wheel attached to the blade root support and centered on an axis radial to the rotating ring and a second gear wheel attached to the rotating ring, centered on an axis tangential to the rotating ring, and bearing a counterweight that is eccentric with respect to an axis of rotation of the second gear wheel; and
   a cylinder centered on the axis of rotation of the rotating ring, attached in rotation to the turbine rotor and a rod of which is connected to each counterweight through connecting arms so as to impart synchronous angular motion to the set of counterweights about the axis of rotation of their respective gear wheel, each connecting arm including a radial link having one end connected to the corresponding counterweight and the other end connected to an arm of a bellcrank in which another arm is connected to the cylinder rod.

2. The device according to claim 1, wherein the radial link of each connecting arm passes radially through a housing arm of the turboprop.

3. The device according to claim 1, wherein the connecting arms are evenly distributed about the axis of rotation of the rotating ring.

4. The device according to claim 1, wherein, for each blade root support, a number of teeth of the first gear wheel of the conical gear train is substantially twice a number of teeth of the second gear wheel.

5. The device according to claim 1, wherein a feathering position of the blades corresponds to an angular position of the counterweights that is directed outward from the rotating ring.

6. The device according to claim 1, wherein a 0° position of the blades corresponds to an unstable angular position of the counterweights directed radially inward from the rotating ring.

7. The device according to claim 1, wherein the set includes ten fan blades.

8. A dual propeller turboprop, comprising:
   a turbine including two counter-rotating rotors and two sets of fan blades having adjustable orientation attached in rotation to a first and a second rotating ring respectively linked to the rotors;
   control of orientation of the fan blades of at least one of the sets being accomplished by each blade of the set being coupled, for control of its orientation, to a blade root support mounted pivotably on the first rotating ring by a conical gear train including a first gear wheel attached to the blade root support and centered on an axis radial to the first rotating ring and a second gear wheel attached to the first rotating ring, centered on an axis tangential to the first rotating ring, and bearing a counterweight that is eccentric with respect to an axis of rotation of the second gear wheel; and
   a cylinder centered on the axis of rotation of the first rotating ring, attached in rotation to the turbine rotor and a rod of which is connected to each counterweight through connecting arms so as to impart synchronous angular motion to the set of counterweights about the axis of rotation of their respective gear wheel, each connecting arm including a radial link having one end connected to the corresponding counterweight and the other end connected to an arm of a bellcrank in which another arm is connected to the cylinder rod.

* * * * *